(12) United States Patent
Padilla et al.

(10) Patent No.: US 7,607,002 B2
(45) Date of Patent: Oct. 20, 2009

(54) SYSTEM AND METHOD FOR INFORMATION HANDLING SYSTEM BOOT DEVICE BRANDING OF BOOT INFORMATION

(75) Inventors: Michael K. Padilla, Round Rock, TX (US); Walter Kemp, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 986 days.

(21) Appl. No.: 11/032,431

(22) Filed: Jan. 10, 2005

(65) Prior Publication Data
US 2006/0155977 A1 Jul. 13, 2006

(51) Int. Cl.
*G06F 9/00* (2006.01)
*G06F 9/24* (2006.01)
*G06F 15/177* (2006.01)

(52) U.S. Cl. .......................................................... 713/1
(58) Field of Classification Search .................. None
See application file for complete search history.

(56) References Cited

U.S. PATENT DOCUMENTS

| | | | |
|---|---|---|---|
| 6,247,126 B1 * | 6/2001 | Beelitz et al. .................. 713/1 |
| 6,732,264 B1 * | 5/2004 | Sun et al. ........................ 713/2 |
| 6,957,286 B1 * | 10/2005 | Cohen ........................... 710/38 |
| 6,988,194 B2 * | 1/2006 | Nunn et al. ..................... 713/2 |
| 2003/0084316 A1 * | 5/2003 | Schwartz .................... 713/200 |
| 2005/0055595 A1 * | 3/2005 | Frazer et al. ................. 713/400 |

OTHER PUBLICATIONS http://;inux.dell.com/projects.shtml "Project" Apr. 18, 2005 3 pages.

* cited by examiner

*Primary Examiner*—Thomas Lee
*Assistant Examiner*—Mohammed H Rehman
(74) *Attorney, Agent, or Firm*—Hamilton & Terrile, LLP; Robert W. Holland

(57) ABSTRACT

Information handling system boot with an operating system initiated by a BIOS maintains consistency of storage device numbering order between the BIOS and the operating system by branding BIOS storage device configuration information on the storage devices for subsequent use by the operating system. A branding module in a Linux operating system retrieves BIOS hard disc drive configuration information from the BIOS during real mode of the boot which allows operating system access to the BIOS, and stores the hard disc drive information on its associated hard disc drive. A branding retrieval module in the Linux operating system retrieves the configuration information from each respective hard disc drive during a protected mode of the boot which does not allow operating system access to the BIOS, and applies the configuration information to the operating system for consistency with the BIOS.

13 Claims, 3 Drawing Sheets

SYSTEM AND METHOD FOR INFORMATION HANDLING SYSTEM BOOT DEVICE BRANDING OF BOOT INFORMATION

BACKGROUND OF THE INVENTION

1. Field of the Invention

The present invention relates in general to the field of information handling system operating system boot, and more particularly to a system and method for information handling system boot device branding with boot information.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are generally assembled from multiple hardware devices that interact with each other and peripheral devices under the management of an operating system. The operating system runs on the central processing unit ("CPU") to enable interaction of software applications with the hardware devices to process information and perform desired tasks. On initial power-up of an information handling system, the operating system is retrieved from permanent storage, such as a hard disc drive, in a process typically known as bootstrapping or boot. Generally, when power is applied to the information handling system a basis input/output system ("BIOS") determines a boot device and initiates retrieval of the operating system from the boot device for loading on the CPU and in random access memory ("RAM"). Typically, with WINDOWS based operating systems, the devices that are capable of supporting a boot are listed in the operating system in an order corresponding to the order in which the BIOS will prioritize initiation of boot from the devices. Often, a device that supports a removable storage medium, such as a floppy or optical drive, is listed with the highest priority followed by hard disc drives in a predetermined order. The BIOS checks each device in order and generally retrieves the operating system from the hard disc drive having the first boot priority.

One difficulty that can arise with an information handling system boot is that the order of the boot devices for the information handling system BIOS does not correspond to the order of the devices as listed in the operating system. For instance, with UNIX based operating systems, such as Linux, there is no relationship between BIOS hard disc drive ordering and operating system drive enumeration. Thus, as boot transitions from the BIOS to the operating system, the different enumerations of the hard disc drives by the BIOS and operating system may result in the operating system seeking to retrieve information for boot from an incorrect hard disc drive, leading to boot failure. Inconsistent enumeration of hard disc drives between the BIOS and operating system is particularly troublesome where Linux is used to load WINDOWS based images on hard disc drives, such as during information handling system manufacture, since the hard disc drive enumeration should ideally match the WINDOWS enumeration. Linux boots initially in a "real" mode and then transitions to a "protected" mode in which an access layer protects information stored on the BIOS so that persistence of data between the modes is not accessible. One solution is have the BIOS store hard disc drive boot information in RAM during the real mode so that the information is accessible during the protected mode, however, this requires modification to BIOS firmware.

SUMMARY OF THE INVENTION

Therefore a need has arisen for a system and method which relates BIOS and operating system hard disc drive enumeration during information handling system boot.

In accordance with the present invention, a system and method are provided which substantially reduce the disadvantages and problems associated with previous methods and systems for relating BIOS and operating system hard disc drive enumeration during an information handling system boot. BIOS configuration information is collected and branded to each hard disc drive at initiation of boot for subsequent retrieval and use by the operating system.

More specifically, a branding module associated with a Linux or UNIX operating system collects hard disc drive configuration information from an information handling system BIOS during a real mode of the boot. The BIOS hard disc drive configuration information includes BIOS ordering of the hard disc drives and partition format information. The branding module brands the configuration information associated with each hard disc drive to each hard disc drive in a predetermined location, such as sector number 57. The operating system continues with the boot to a protected mode in which the BIOS is not accessible. A branding retrieval module associated with the operating system polls the hard disc drives to retrieve the information branded on each and sorts the hard disc drives according to the retrieved BIOS numbering. The branding retrieval module applies the BIOS numbering to the operating system hard disc drive identification to ensure consistency between the operating system and BIOS reference numbers.

The present invention provides a number of important technical advantages. One example of an important technical advantage is that BIOS and operating system hard disc drive numbering is kept consistent by branding information from the BIOS to the hard disc drives for subsequent reference by the operating system. Linux and UNIX operating system boots in the real mode retrieve the BIOS information and brand the hard disc drives without requiring alterations to the BIOS. The operating system then retrieves the branded information during the protected mode of the boot from the hard disc drives, allowing persistence of BIOS configuration information-for use by the operating system even though the BIOS is not accessible by the operating system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Hard disc drive numbering for an information handling system BIOS and operating system are kept consistent by branding the BIOS numbering to the hard disc drives for subsequent reference by the operating system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
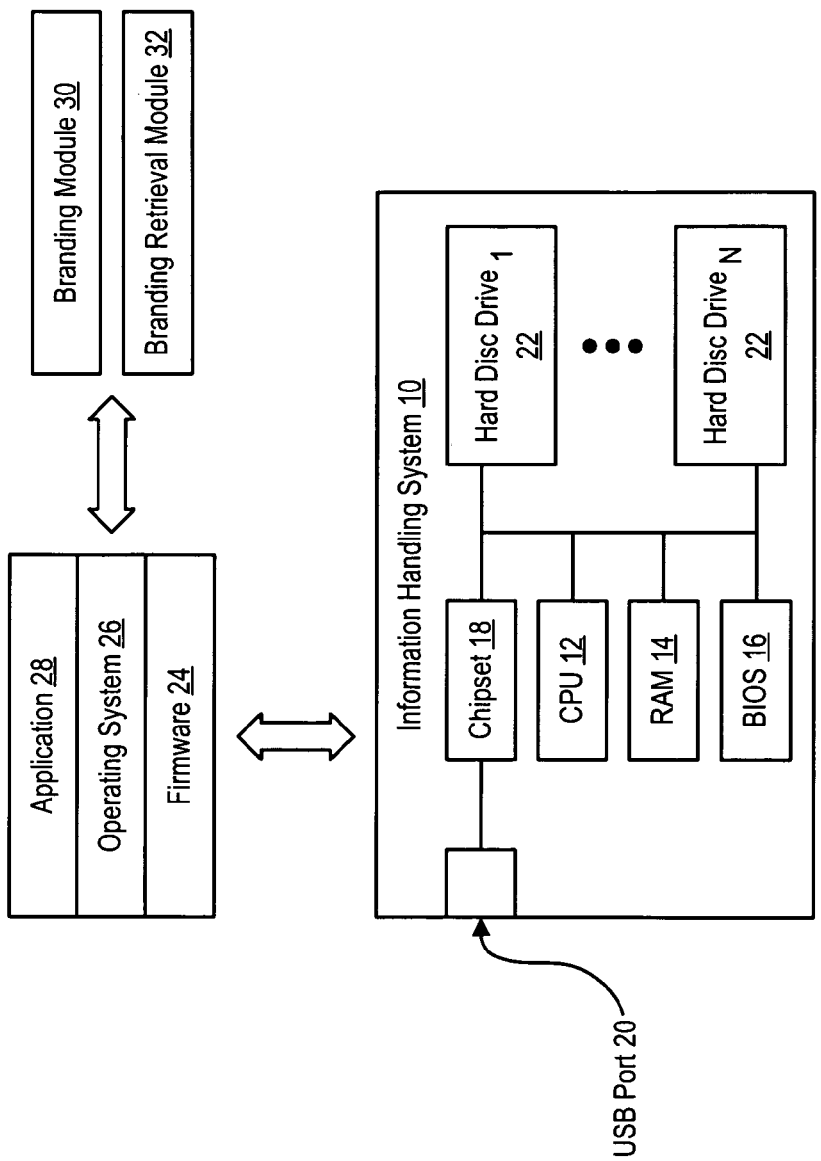
FIG. 1 depicts a functional block diagram of an information handling system operable to boot with branded information.

Referring now to FIG. 1, a functional block diagram depicts an information handling system 10 operable to boot with branded information. Information handling system 10 includes a variety of interfaced processing components which cooperate to process information, including a CPU 12, RAM 14, a BIOS 16, a chipset 18, which interfaces external ports such as USB port 20, and plural hard disc drives 22. To start-up from a powered-down state, information handling system 10 applies instructions to CPU 12 at a firmware layer 24, such as instructions stored in firmware of BIOS 16, that retrieve and run an operating system layer 26. For instance, firmware instructions within BIOS 16 retrieve the operating system from a storage device, such as a hard disc drive 22, to initiate the operating system. Once operating system layer 26 is initiated, operating system instructions bring information handling system 10 to an operational state for supporting an application layer 28. Firmware instructions from BIOS 16 determine the storage device from which the operating system is retrieved from an ordered list of storage devices and other configuration information stored on BIOS 16, such as hard disc drive partition format information.

Once the operating system is initiated by BIOS 16, proper boot generally requires that the operating system identify storage devices in a relationship corresponding to the BIOS identification so that the operating system continues the boot from the same storage device. Protected mode operating systems, such as Linux and Unix, do not necessarily order storage devices in the boot order configured in BIOS 16. Further, although protected mode operating systems have access to BIOS configuration information during an initial "real" mode of the boot, BIOS information is not accessible during a "protected" mode of the boot in which operating system storage disc order is assigned. An abstraction layer to the BIOS and hardware devices prevents access by protected mode operating systems to the BIOS information. In order to maintain consistency in BIOS and operating system numbering of storage devices, operating system 26 has a branding module 30 and a branding retrieval module 32 which provide persistence of BIOS configuration information otherwise not accessible to operating system 26. After initiation of boot in the real mode, branding module 30 retrieves storage device configuration information from BIOS 16, such as hard disc drive numbering and partition formatting, and writes the configuration information to the storage devices. For instance, each hard disc drive 22 is branded with its respective BIOS order number in sector 57 to avoid conflicts with WINDOWS functions. After transition to the protected mode of boot, branding retrieval module 32 retrieves the BIOS numbering from each branded storage device and applies the BIOS numbering for use by the operating system. Applying branded hard disc drive order numbers to the operating system ordering ensures consistent reference by the operating system throughout information handling system boot.

Figure 2:
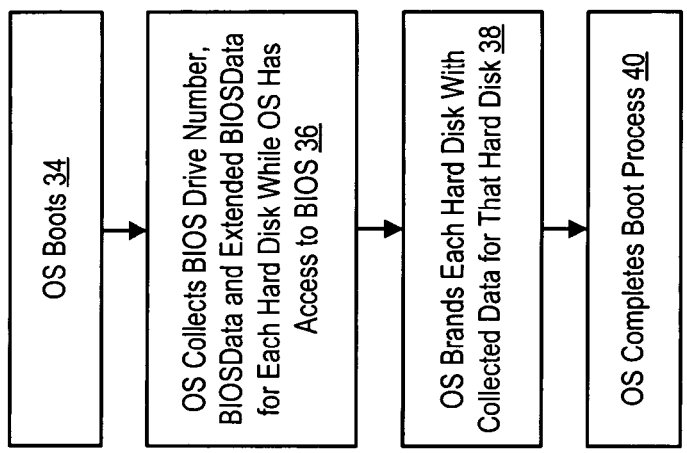
FIG. 2 depicts a flow diagram of a process for collecting and branding hard disc drive configuration information during a real mode of an operating system boot.

Referring now to FIG. 2, a flow diagram depicts a process for collecting and branding hard disc drive configuration information during a real mode of an operating system boot. The process begins at step 34 with initiation of operating system boot by the BIOS firmware instructions. At step 36, the operating system calls the branding module to collect BIOS drive number, BIOSData and Extended BIOSData for each hard disc drive while the operating system has access to the BIOS. At step 38, each hard disc drive is branded with the information collected from the BIOS for that hard disc drive. Once the BIOS hard disc drive configuration information is branded to each respective hard disc drive, the process continues to step 40 for completion of the boot in the protected mode.

Figure 3:
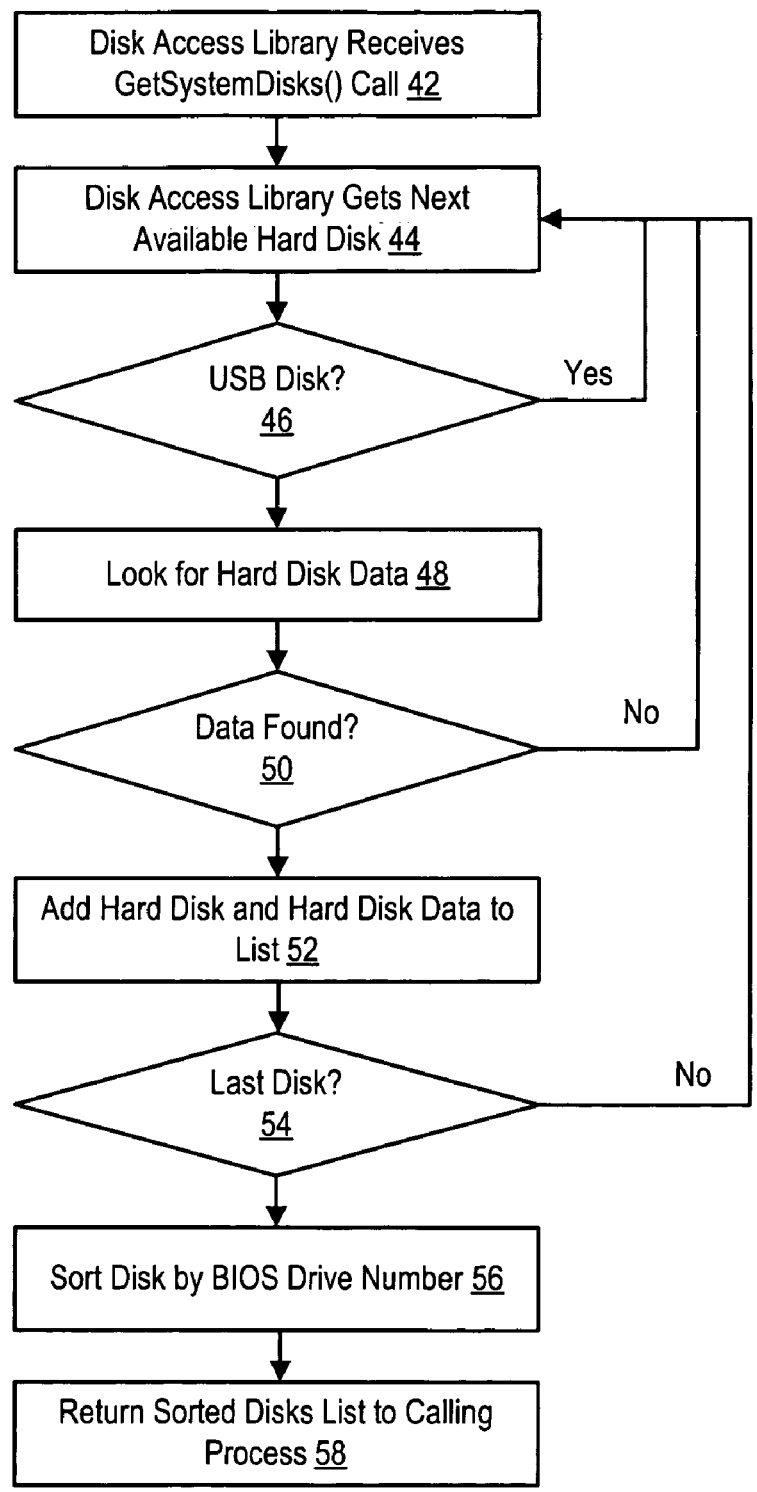
FIG. 3 depicts a flow diagram of a process for retrieving and applying branded hard disc drive configuration information during a protected mode of an operating system boot.

Referring now to FIG. 3, a flow diagram depicts a process for retrieving and applying branded hard disc drive configuration information during a protected mode of an operating system boot. The process begins at step 42 with the Disc Access Library receiving a getSystemDiscs call from the branding retrieval module. At step 44, the next available hard disc in the operating system order is retrieved. At step 46, if the disc is a USB disc, the process skips branding of the disc and returns to step 44. If the disc is not a USB disc, the process continues to step 48 to search the disc for branded information. If at step 50 no branded information is found, the process returns to step 44. If branded information is found at step 50, the process continues to step 52 and the hard disc drive and its associated data are added to a list of BIOS identified hard disc drives. If at step 54 additional discs remain, the process returns to step 44. If at step 54 no additional discs remain, the process continues to step 56 for sorting of the discs from the list by BIOS drive number. At step 58, the sorted list is returned to the branding retrieval module for application to the operating system so that the BIOS and operating system have consistent hard disc drive numbering.

Although the present invention has been described in detail, it should be understood that various changes, substitutions and alterations can be made hereto without departing from the spirit and scope of the invention as defined by the appended claims.

What is claimed is:

1. A method for loading an operating system on an information handling system, the method comprising:
   initiating the operating system in a first mode;
   retrieving with the operating system an order of storage devices;
   storing with the operating system the order of storage devices on at least one of storage device;
   initiating the operating system in a second mode;
   retrieving the order of the storage devices from the storage device; and
   applying the retrieved order of storage devices to the operating system.

2. The method of claim 1 wherein the operating system first mode is a real mode and the operating system second mode is a protected mode.

3. The method of claim 1 wherein retrieving with the operating system an order of storage devices further comprises retrieving an order of storage devices from a BIOS of the information handling system.

4. The method of claim 3 wherein the storage devices comprise hard disc drives.

5. The method of claim 4 further comprising retrieving hard disc drive partition information with the order of storage devices.

6. The method of claim 4 wherein storing with the operating system the order of storage devices further comprises storing at least some order of storage devices information on each hard disc drive.

7. A method for booting an information handling system, the method comprising:
   initiating the operating system with firmware, the firmware associating each of one or more storage devices with a numerical order;
   retrieving the numerical order from the firmware;
   storing the numerical order associated with each storage device on that storage device; and
   booting the information handling system with the operating system by retrieving the numerical order from each storage device and applying the retrieved numerical order to the operating system identification of the storage devices.

8. The method of claim 7 wherein the storage devices comprise hard disc drives.

9. The method of claim 8 further comprising:
   retrieving hard disc drive partition format information from the firmware; and
   storing the hard disc drive partition formation information associated with each hard disc drive on that hard disc drive.

10. The method of claim 8 wherein the firmware comprises a BIOS.

11. The method of claim 8 wherein:
    initiating the operating system with firmware further comprises initiating a real mode of the operating system; and
    booting the information handling system with the operating system further comprises initiating a protected mode of the operating system that retrieves the numerical order.

12. The method of claim 8 wherein booting the information handling system further comprises:
    sorting the storage devices by the numerical order; and
    assigning the sorted numerical order to the operating system identification of the storage devices.

13. The method of claim 8 wherein the operating system is Linux.

* * * * *